(12) United States Patent
Hung et al.

(10) Patent No.: US 8,350,824 B2
(45) Date of Patent: Jan. 8, 2013

(54) SENSING METHOD FOR A CAPACITIVE TOUCH SYSTEM

(75) Inventors: Tse-Lun Hung, Taipei (TW);
Jung-Shou Huang, Da-an Shiang (TW);
Hsin-Shieh Tsai, Yuanlin Town (TW)

(73) Assignee: Elan Microelectronics Corporation, Hsinchu (TW)

( * ) Notice: Subject to any disclaimer, the term of this patent is extended or adjusted under 35 U.S.C. 154(b) by 953 days.

(21) Appl. No.: 12/385,095

(22) Filed: Mar. 31, 2009

(65) Prior Publication Data

US 2009/0251429 A1 Oct. 8, 2009

(30) Foreign Application Priority Data

Apr. 2, 2008 (TW) ............................... 97112058 A

(51) Int. Cl.
*G06F 3/045* (2006.01)
(52) U.S. Cl. .................... 345/174; 345/173; 178/18.06; 178/18.01
(58) Field of Classification Search ........................ None
See application file for complete search history.

(56) References Cited

U.S. PATENT DOCUMENTS

| 3,644,935 | A  | * | 2/1972 | Lourie ........................... 345/103 |
| 5,534,892 | A  | * | 7/1996 | Tagawa .......................... 345/173 |
| 7,417,676 | B2 | * | 8/2008 | Kimura .......................... 348/246 |
| 2008/0100586 | A1 | * | 5/2008 | Smart ........................... 345/173 |
| 2008/0158172 | A1 | * | 7/2008 | Hotelling et al. ............. 345/173 |
| 2008/0158177 | A1 | * | 7/2008 | Wilson et al. ................. 345/173 |
| 2008/0162997 | A1 | * | 7/2008 | Vu et al. .......................... 714/27 |
| 2009/0040189 | A1 | * | 2/2009 | Lee ................................ 345/173 |

* cited by examiner

*Primary Examiner* — William L Boddie
*Assistant Examiner* — Christopher Thompson
(74) *Attorney, Agent, or Firm* — Rosenberg, Klein & Lee

(57) ABSTRACT

A capacitive touch system uses at least two touch integrated circuits to simultaneously scan a touch panel, each of the touch integrated circuits only for scanning a portion of the traces of the touch panel. Therefore, the capacitive touch system can maintain a good frame rate, even the touch panel is a large scale touch panel. Sensing methods are provided to determine a sensed value for a boundary trace which is the last one of the traces connected to a first touch integrated circuit and prior to the first one of the traces connected to a second touch integrated circuit.

3 Claims, 7 Drawing Sheets

SENSING METHOD FOR A CAPACITIVE TOUCH SYSTEM

FIELD OF THE INVENTION

The present invention is related generally to a capacitive touch system and, more particularly, to a sensing method for a capacitive touch system.

BACKGROUND OF THE INVENTION

In conventional applications, all the large scale capacitive touch panels use a surface capacitance sensing technique to scan thereto for determining a touch information, which uses a set of sensing currents, each directed to an endpoint of the large scale touch panel to produce sensed values, and therefore, even multiple fingers simultaneously touch the large scale touch panel, this sensing technique still retrieves only one set of sensed currents in response to this multi-finger touch. For this reason, the surface capacitance sensing technique can identify only one set of absolute coordinates. In a two dimensional matrix for instance, only one set of parameters (X,Y) will be determined, and thereby it can't implement a multi-finger touch detection.

An all points addressable (APA) projected capacitance sensing technique is capable of implementing a multi-finger touch detection, but not applicable to large scale touch panels because, to implement this sensing technique, it is necessary to charge and discharge each point sensor on the large scale touch panel. Taking a matrix-type touch panel for example, when the X and Y traces increase, the pixel number of an APA projected capacitance touch panel dramatically increases and thereby significantly degrades the frame rate of the touch panel due to the very long time period for scanning the large scale touch panel in a frame.

An axis intersect (AI) projected capacitance sensing technique is also capable of implementing a multi-finger touch detection, but not applicable to large scale touch panels, too. FIG. 1 is a schematic diagram of a conventional AI projected capacitance sensing technique applied to a small scale touch panel 10, in which an AI projected capacitance touch IC 12 is used to scan the small scale touch panel 10. Assuming that the AI projected capacitance touch IC 12 can support up to 22 traces, a good frame rate can be attained for a small scale touch panel 10 having ten X traces TRX1-TRX10 and ten Y traces TRY1-TRY10. However, if a this type touch IC 12 is applied to a large scale touch panel 14 having forty X traces TRX1-TRX40 and forty Y traces TRY1-TRY40, as shown in FIG. 2, the total number of traces that the touch IC 12 needs to scan dramatically increases. Unfortunately, the frame rate of the overall touch panel application is dependent to a very large extent on the time it takes the touch IC 12 to charge and discharge capacitors each time. In other words, the frame rate is determined mainly by the time in a frame that the touch IC 12 charges and discharges the capacitors. Hence, if an AI projected capacitance touch IC capable of scanning a greater number of traces is applied to a large scale touch panel 14, a major drawback would be a significantly decreased frame rate in the overall application, which leads to compromised performance at the application end.

SUMMARY OF THE INVENTION

An object of the present invention is to provide sensing methods for a capacitive touch system.

According to the present invention, a capacitive touch system uses at least two touch integrated circuits to simultaneously scan a touch panel, each of the touch integrated circuits only for scanning a portion of the traces of the touch panel. Therefore, the capacitive touch system can maintain a good frame rate, even the touch panel is a large scale touch panel. Sensing methods are provided to determine a sensed value for a boundary trace which is the last one of the traces connected to a first touch integrated circuit and prior to the first one of the traces connected to a second touch integrated circuit.

In a first approach, at least one from the ADC values of the traces prior to the boundary trace and at least one from the ADC values of the traces behind the boundary trace are used to calculate for determining a sensed value for the boundary trace.

In a second approach, the boundary trace is scanned to obtain a first ADC value, which is used to produce a second ADC value as the sensed value of the boundary trace. The second ADC value is a function of the first ADC value.

In a third approach, each of the touch integrated circuits each time selects only one trace to charge thereto and discharge therefrom, in order to obtain an ADC value. Each trace, including the boundary trace, has its sensed value being determined by its ADC value, and the other ADC values are not used to determine this sensed value.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
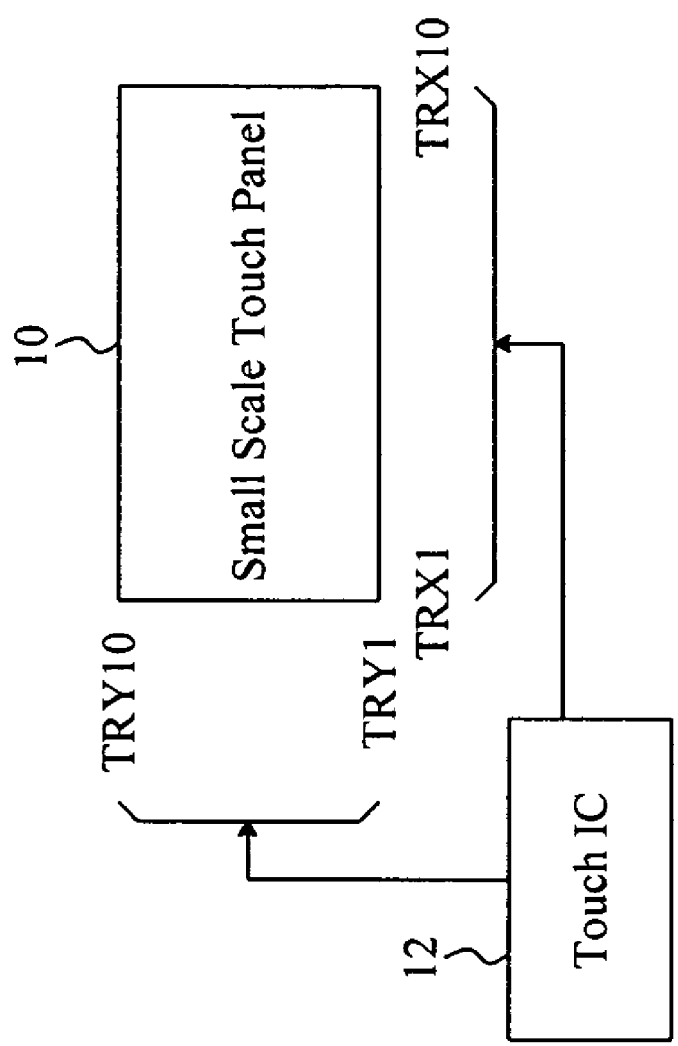
FIG. 1 is a schematic diagram of a conventional AI projected capacitance sensing technique applied to a small scale touch panel.
Figure 2:
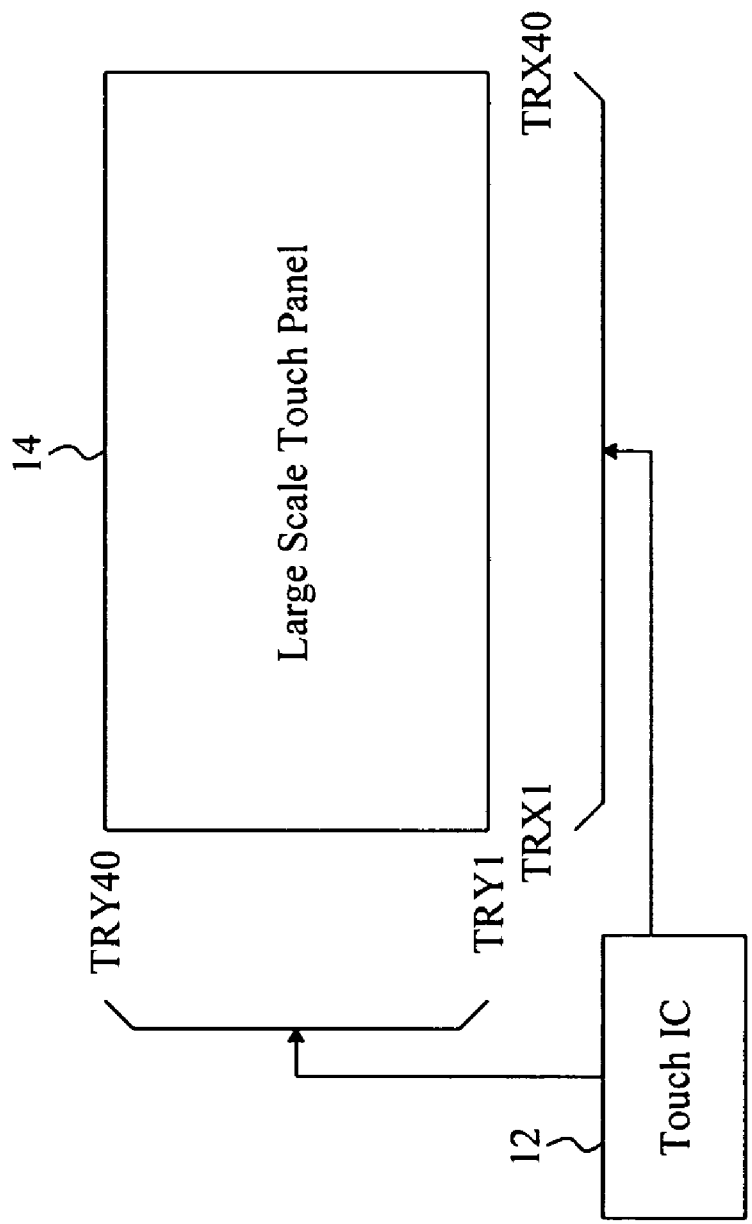
FIG. 2 is a schematic diagram of a conventional AI projected capacitance sensing technique applied to a large scale touch panel.
Figure 3:
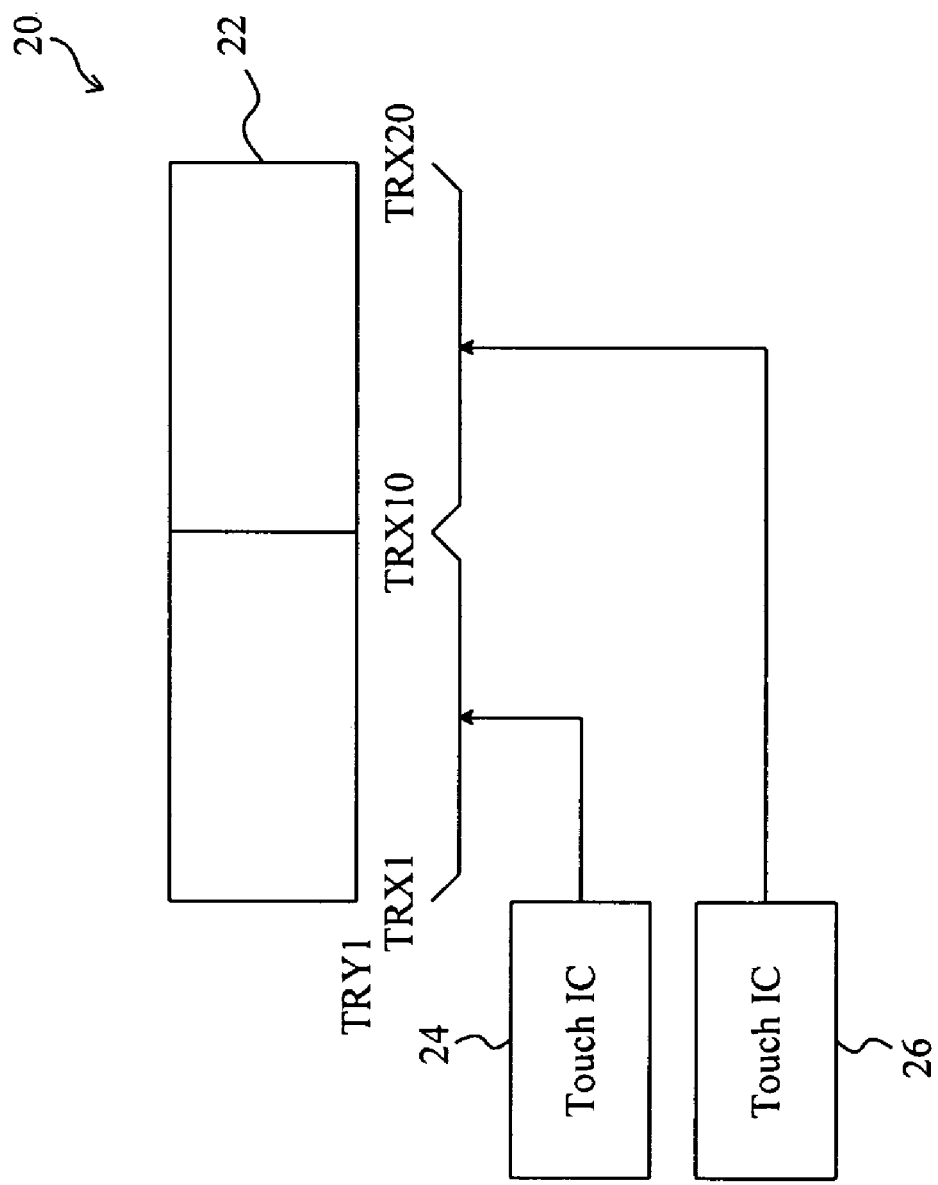
FIG. 3 is a schematic diagram of a capacitive touch system using at least two AI projected capacitance touch ICs to scan a touch panel.
Figure 4:
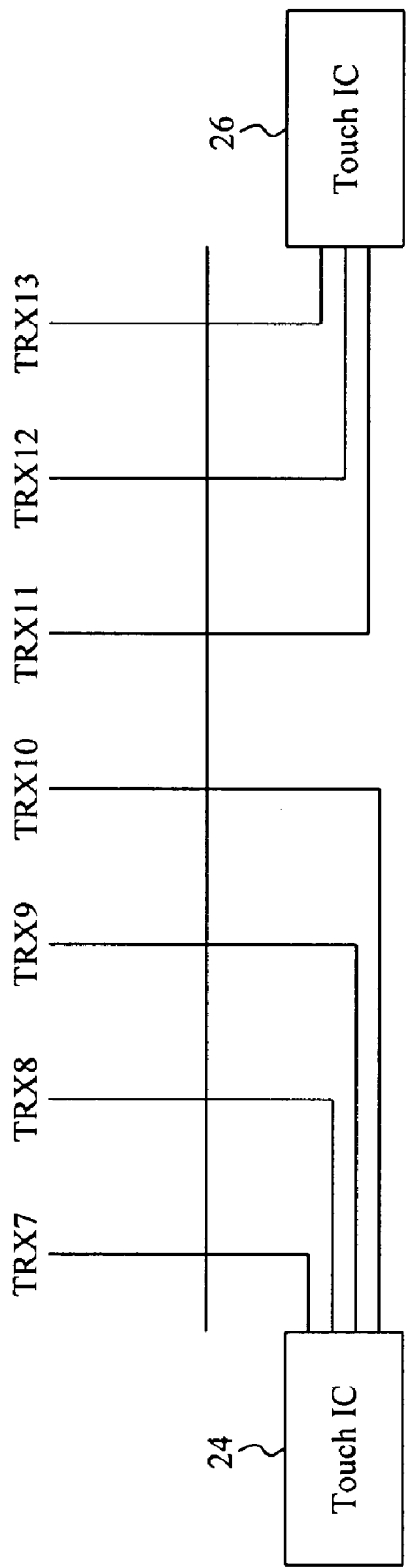
FIG. 4 is a schematic diagram of an enlarged portion of the capacitive touch system of FIG. 3.

According to the present invention, as shown in FIG. 3, a capacitive touch system 20 uses at least two AI projected capacitance touch ICs 24 and 26 to scan a touch panel 22. The touch panel 22 has a plurality of first traces TRX1-TRX10 connected to the touch IC 24, and a plurality of second traces TRX11-TRX20 connected to the touch IC 26, of which the first one TRX11 of the second traces TRX11-TRX20 is next to the last one TRX10 of the first traces TRX1-TRX10. FIG. 4 is a schematic diagram of an enlarged portion of the capacitive touch system 20, which shows the boundary trace TRX10 and its neighboring traces. In the capacitive touch system 20, the touch IC 24 is responsible for scanning the traces TRX1-TRX10, and the touch IC 26 is responsible for scanning the traces TRX11-TRX20. By using the touch ICs 24 and 26 to simultaneously scan the touch panel 22, a multi-finger touch detection and a good frame rate can be achieved, even the touch panel 22 is a large scale touch panel. Conventionally, a capacitive touch IC for a small scale touch panel generally uses two traces to determine a sensed value for a trace, by which the trace to be sensed and the neighboring one next to this trace (with their capacitors) are simultaneously charged thereto and discharged therefrom to obtain two analog-to-digital conversion (ADC) values therefrom, and then a better ADC value is produced by calculating with these two ADC values as the sensed value of the trace to be sensed. If this sensing method is applied to a capacitive touch system using at least two capacitive touch ICs to scan the traces in a same direction, as that shown in FIGS. 3 and 4, there will be a boundary issue. When the touch IC 24 scans the traces TRX1-TRX10, the sensed values of the traces TRX1-TRX9 could be determined by the conventional sensing method. For example, referring to FIG. 4, to determine a sensed value for the trace TRX7, both the traces TRX7 and TRX8 are charged thereto and discharged therefrom at a same time to obtain the ADC values of the traces TRX7 and TRX8, and then these two ADC values are used to determine the sensed value of the trace TRX7. Similarly, the ADC values of the traces TRX8 and TRX9 are used to determine a sensed value for the trace TRX8, and the ADC values of the traces TRX9 and TRX10 are used to determine a sensed value for the trace TRX9. For the boundary trace TRX10, however, the next trace TRX11 is connected to another touch IC 26, instead of the touch IC 24, and thus the touch IC 24 cannot determine a sensed value for the trace TRX10 as done by the conventional sensing method. For this boundary issue, sensing methods are provided for a capacitive touch system using at least two capacitive touch ICs to scan the traces of a touch panel, as that shown in FIGS. 3 and 4.

Figure 5:
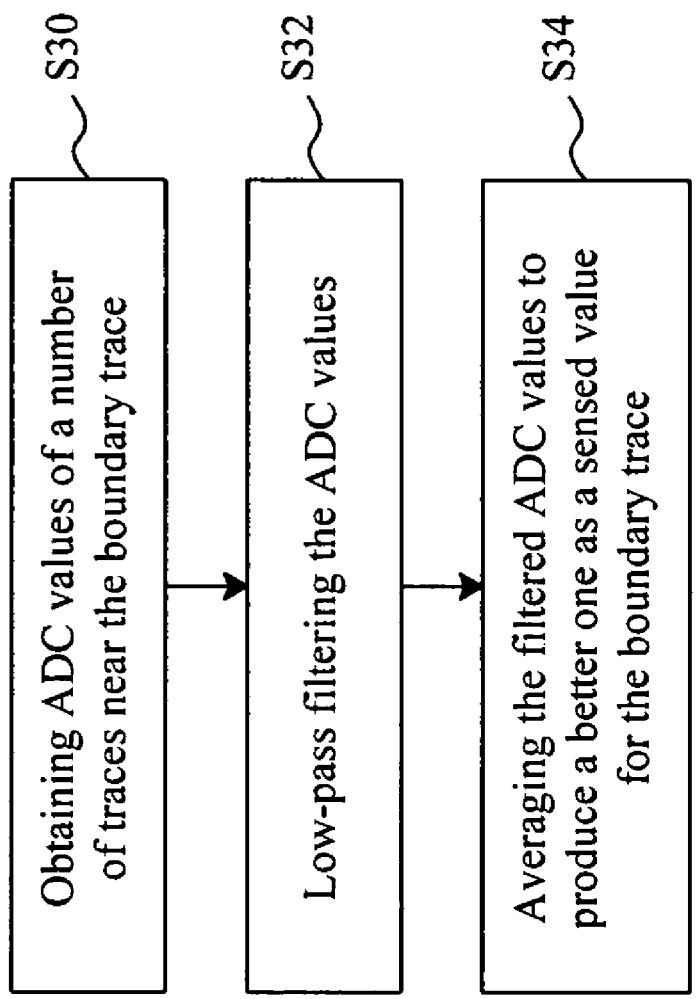
FIG. 5 is a schematic diagram showing a first embodiment according to the present invention for a boundary issue.

FIG. 5 is a schematic diagram showing a first approach according to the present invention. This sensing method uses the touch IC 24 to scan the traces TRX1-TRX9 in the same way as the conventional sensing method, by which for each of the traces TRX1-TRX9 the trace and the next one are charged thereto and discharged therefrom to obtain two ADC values to determine a sensed value for the trace. While scanning the boundary trace TRX10, a number of traces near the boundary trace TRX10 are used to determine the sensed value of the boundary trace TRX10. As shown in FIG. 5, step S30 selects at least one from the ADC values of the traces prior to the boundary trace TRX10 and at least one from the ADC values of the traces behind the boundary trace TRX10. For example, the ADC values of the trace TRX9 prior to the boundary trace TRX10 and the trace TRX11 next to the boundary trace TRX10 are selected. Then, the selected ADC values are low-pass filtered in step S32. Finally, step S34 calculates the average of the filtered ADC values to produce a better ADC value as the sensed value of the boundary trace TRX10. This calculation may be executed by either one of the touch ICs 24 and 26, or one other than the touch ICs 24 and 26. For this calculation, either one or both of the filtered ADC values will be sent to where to execute the calculation.

Figure 6:
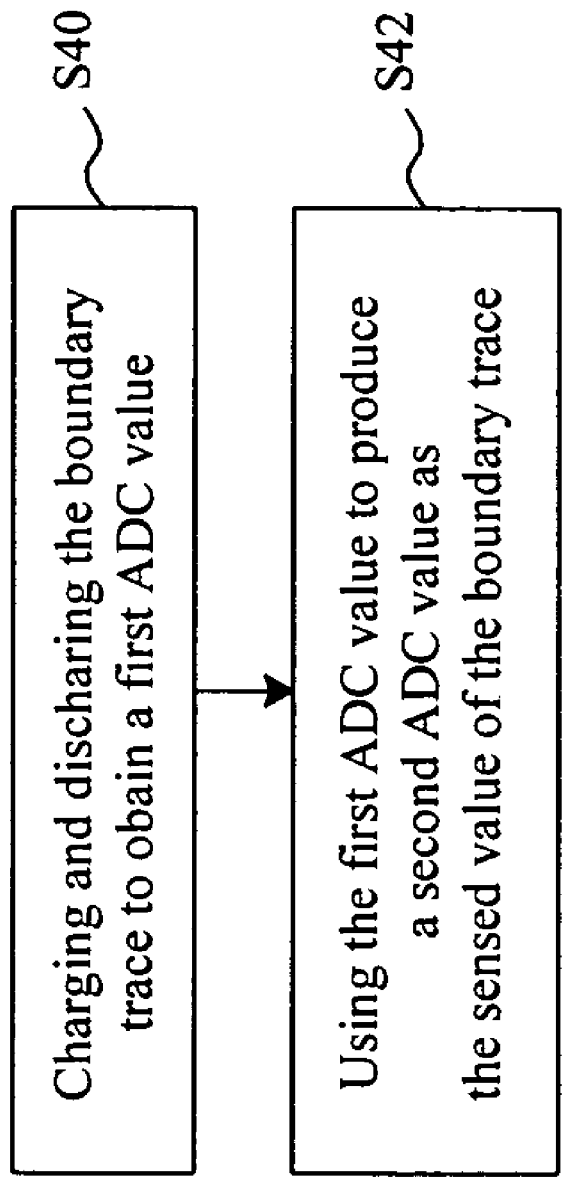
FIG. 6 is a schematic diagram showing a second embodiment according to the present invention for a boundary issue.

FIG. 6 is a schematic diagram showing a second approach according to the present invention. This sensing method determines the sensed values of the traces TRX1-TRX9 as done by the conventional sensing method, which charges to and discharges from the trace to be sensed and the next one to obtain two ADC values to determine a sensed value for the trace to be sensed. For the boundary trace TRX10, the scanning mode is switched to a single-trace scanning mode, in which only a single trace, i.e., the boundary trace TRX10, is used to obtain an ADC value to determine a sensed value for this single trace. Referring to FIG. 6, step S40 charges and discharges the boundary trace TRX10 to obtain a first ADC value therefrom, and then in step S42, the first ADC value is used to produce a better ADC value as the sensed value of the boundary trace TRX10. The second ADC value is a function of the first ADC value. For example, the first ADC value is multiplied by two to be the second ADC value.

Figure 7:
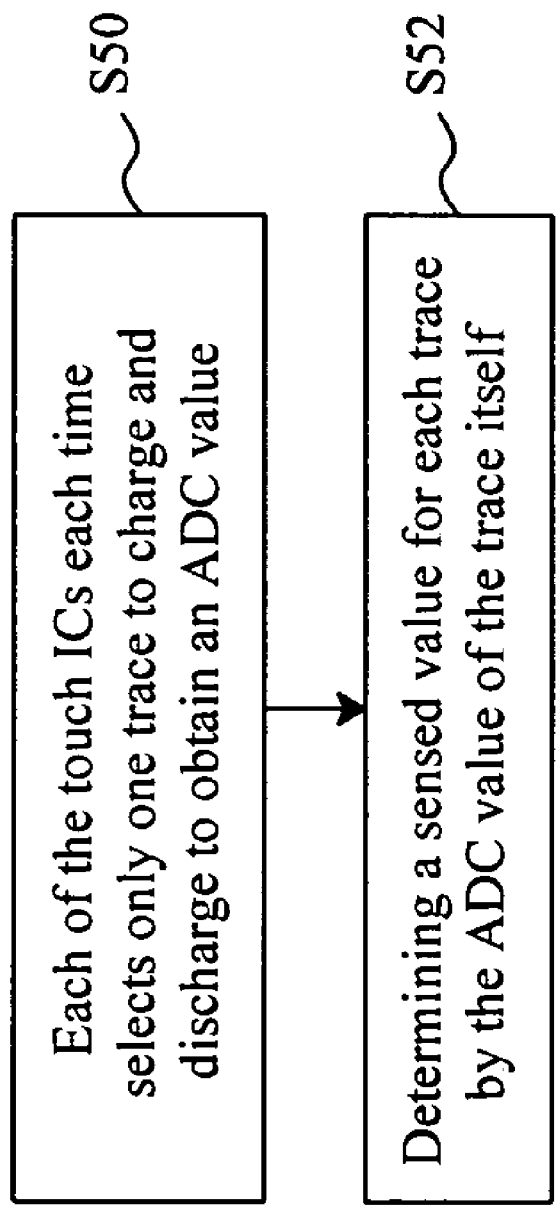
FIG. 7 is a schematic diagram showing a third embodiment according to the present invention for a boundary issue.

FIG. 7 is a schematic diagram showing a third approach according to the present invention. This sensing method determines the sensed value for each trace by its ADC value only. In step S50, for each of the traces TRX1-TRX20, each of the touch ICs 24 and 26 uses only the trace itself to determine its sensed value. For example, the touch IC 24 each time charges and discharges only the trace to be sensed to obtain its ADC value, and then step S52 uses this obtained ADC value to determine a sensed value for this trace that provides this ADC value. No other traces will provide their ADC values to determine the sensed value for any trace not themselves.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A sensing method for a capacitive touch system including a touch panel having a plurality of first traces and a plurality of second traces, of which the first one of the plurality of second traces is next to the last one of the plurality of first traces, the sensing method comprising the steps of:

(A) scanning the plurality of first traces by a first touch integrated circuit and the plurality of second traces by a second touch integrated circuit, each of the plurality of first traces except the last one thereof providing a first ADC value, each of the plurality of second traces providing a second ADC value;

(B) selecting at least one from the first ADC values and at least one from the second ADC values; and (C) calculating with the selected ADC values to determine a sensed value for the last one of the plurality of first traces.

2. The sensing method of claim 1, wherein the step C comprises averaging the selected ADC values to obtain an average thereof as the sensed value for the last one of the plurality of first traces.

3. The sensing method of claim 1, wherein the step C comprises low-pass filtering the selected ADC values to determine the sensed value for the last one of the plurality of first traces.

* * * * *